United States Patent
Sandham

(10) Patent No.: US 7,203,636 B2
(45) Date of Patent: Apr. 10, 2007

(54) ENDIAN TRANSFORMATION

(75) Inventor: John H. Sandham, Manchester (GB)

(73) Assignee: Transitive Limited, Manchester (GB)

( * ) Notice: Subject to any disclaimer, the term of this patent is extended or adjusted under 35 U.S.C. 154(b) by 712 days.

(21) Appl. No.: 09/827,739

(22) Filed: Apr. 6, 2001

(65) Prior Publication Data

US 2004/0204929 A1 Oct. 14, 2004

Related U.S. Application Data

(63) Continuation-in-part of application No. PCT/GB99/03167, filed on Oct. 11, 1999.

(60) Provisional application No. 60/115,954, filed on Jan. 14, 1999.

(30) Foreign Application Priority Data

Oct. 10, 1998 (GB) .................................. 9822074

(51) Int. Cl.
*G06F 9/455* (2006.01)

(52) U.S. Cl. ........................... 703/26; 703/20; 703/21; 703/26; 712/204

(58) Field of Classification Search ................ 703/20, 703/21, 26, 27; 718/1; 712/204; 717/136
See application file for complete search history.

(56) References Cited

U.S. PATENT DOCUMENTS

| | | | | |
|---|---|---|---|---|
| 5,398,328 A | * | 3/1995 | Weber et al. ................ | 717/143 |
| 5,630,084 A | * | 5/1997 | Ikumi ......................... | 712/200 |
| 5,687,337 A | * | 11/1997 | Carnevale et al. .......... | 712/204 |
| 5,781,763 A | * | 7/1998 | Beukema et al. ............. | 710/22 |
| 5,828,884 A | * | 10/1998 | Lee et al. .................... | 717/141 |
| 5,867,690 A | * | 2/1999 | Lee et al. ..................... | 710/65 |
| 5,907,865 A | * | 5/1999 | Moyer ........................ | 711/201 |
| 5,928,349 A | * | 7/1999 | Loen et al. ..................... | 712/1 |
| 5,960,201 A | * | 9/1999 | Ma et al. ..................... | 717/154 |
| 5,968,164 A | * | 10/1999 | Loen et al. ................. | 712/204 |
| 6,021,275 A | * | 2/2000 | Horwat ....................... | 717/159 |
| 6,055,619 A | * | 4/2000 | North et al. .................. | 712/36 |
| 6,314,501 B1 | * | 11/2001 | Gulick et al. ............... | 711/153 |
| 6,341,345 B1 | * | 1/2002 | Auslander et al. .......... | 715/204 |

FOREIGN PATENT DOCUMENTS

EP 0764899 7/2000

OTHER PUBLICATIONS

Microsoft Computer Dictionary, 2002, Microsoft Press, Fifth Edition, p. 191.*
Kenneth J. Ayala, The 8086 Microprocessor, 1995, Delmar Publishers, pp. 58-64.*
Michael Main and Walter Savitch, "Data Structures & Other Objects Using C++", 1997, Addison Wesley Longman, pp. 306-319.*
Andrew S. Tanenbaum, "Structured Computer Organization", 1999, Prentice Hall Inc., Fourth Edition, pp. 58-61.*
Keith Diefendorff, "The PowerPC User Instruction Set Architecture", 1994, IEEE Micro, pp. 30-41.*
Cohen, N.H. "Endian-Independent Record Representation Clauses," *ADA Letters, US, Association for Computing Machinery*, NY, NY; vol. 14 No. 1, pp. 27-29, Feb. 1994.
Motorola: Power PC 604e, RISC Microprocessor User's Manual; Mar. 1998; pp. 1-12 and 1-13.
Stallings: "Endian Issues," BYTE, Sep. 1995, downloaded from the internet on Jul. 1, 2000; URL: www.byte.com/art/9509/sec12/art1.htm (and associated images).

* cited by examiner

*Primary Examiner*—Paul Rodriguez
*Assistant Examiner*—Jason Proctor
(74) *Attorney, Agent, or Firm*—Wilmer Cutler Pickering Hale and Dorr LLP

(57) ABSTRACT

A method for emulating a processor of a first endian type on a processor of a second endian type, wherein each memory access address B of string length L is transformed to the address A−B−L+S, wherein A is the total number of bytes allocated to a program, and S is the start address of the program.

6 Claims, No Drawings

ENDIAN TRANSFORMATION

RELATED APPLICATIONS

This patent application is a continuation-in-part of pending PCT Application No. PCT/GB99/03 167, filed on Oct. 11, 1999, which is incorporated by reference in its entirety herein, and claims priority to U.S. Provisional Patent Application No. 60/115,954, filed on Jan. 14, 1999, which is incorporated by reference in its entirety herein, and claims priority to GB Patent Application No. 9822074.2, filed on Oct. 10, 1998, which is incorporated by reference in its entirety herein.

This invention relates to an endian transformation method and system.

A problem commonly encountered by emulation systems, which run identical software on different computer processor chips is format incompatibility. One aspect of this incompatibility resides in the format in which strings of data (eg. 2-byte words or 4-byte words) are expressed. In many computer architectures, each byte of a 4-byte word has its own individual memory address; this gives rise to two possibilities for numbering the bytes within a word. In a big-endian convention, the word whose bytes are addressed (X, X+1, X+2 AND X+3) has its most significant byte addressed X, while in a little-endian convention, the address ordering is the reverse of this so that the least significant byte is addressed X and the most significant byte is addressed X+3. Other "endian formats" are known in which different conventions are observed for ordering the significance of bytes within words, but in most commercially available systems either the big-endian or little-endian convention is observed. The ordering of bits within each byte is the same whether the memory address convention is big-endian or little-endian.

Emulation systems are available which enable software (such as an operating system or an application program) of one endian format to operate on hardware of an opposite endian format. Generally, systems of this type convert each word between endian representations on a word-by-word basis. This conversion, when required frequently, introduces a significant overhead into the time required to perform a given task.

It is an object of the present invention to provide an efficient method and system to enable software of one endian format to run on hardware of a different endian format.

According to the invention there is provided a method for emulating a processor of a first type which observes a first convention for ordering the significance of bytes within words on a second type of processor which observes a second convention for ordering the significance of bytes within words, wherein memory access addresses are transformed such that bytes stored in a memory addressed by a processor of the second type as a result of an instruction in which a byte order in accordance with the first convention is observed are distributed in a pattern which is a mirror image of the distribution pattern of the bytes which would result if the memory was addressed by a processor of the first type in response to the said instruction.

The invention also provides a method for emulating a processor of a first type which observes a first convention for ordering the significance of bytes within words on a second type of processor which observes a second convention for ordering the significance of bytes within words, the order of the second convention being the reverse of the order of the first, wherein memory access addresses are transformed such that the offset between addresses of any two bytes stored in memory is unaltered by the transformation and the relative order of the addresses of any two bytes stored in the memory is reversed by the transformation.

The invention further provides a method for emulating a processor of a first type which observes a first convention for ordering the significance of bytes within words on a second type of processor which observes a second convention for ordering the significance of bytes within words, wherein memory access addresses are transformed such that strings of bytes in the first endian format which are stored successively by the processor operating in accordance with the second endian format aggregate in the same manner as the bytes would aggregate if the processor was of the first endian format and memory access addresses were not transformed.

The invention still further provides a method for emulating a processor of a first type which observes a first convention for ordering the significance of bytes within words on a second type of processor which observes a second convention for ordering the significance of bytes within words, wherein each memory access address B of string length L is transformed to the address A−B−L+S, wherein A is the total number of bytes allocated to a program, and S is the start address of the program.

Assuming a big-endian processor and a little-endian program, the address transformations ensure that bytes aggregate in the memory in a pattern which is a mirror image of the pattern which would have resulted if the processor had been little-endian and no address transformation had been performed. The invention will operate in the same manner for a little-endian processor and a big-endian program. It is important to note that the transformation has no effect on the ordering of bits within each byte. The result is a system which provides a considerable time saving when compared to known endian conversion methods, which convert each string of bytes between endian representations each time that string is used.

According to the invention there is provided an endian transformation system, the system comprising means for transforming an address location of a code represented in a first endian format into an address in a second endian format, the transformation comprising introducing an offset into the address, the size of the offset being determined from the difference between the address location of the code and a predefined address location.

According to a further aspect of the present invention there is further provided a process for compiling or translating a computer program code instruction using transformed address space references in the compiled or translated code especially configured for execution on a programmable machine utilizing a corresponding predetermined convention for ordering the significance of bytes within words of said address space, said process comprising:

(a) during compilation or translation of a code instruction referring to a memory address, transforming the referenced memory address with respect to a fixed block size of memory in the predetermined programmable machine so as to change the referenced address value by an amount that is fixed for a given number of bytes being accessed in each word; and (b) including the thus changed address reference in a compiled or translated output instruction so that there is no extra operation required during execution of the output instruction to accommodate the convention for ordering bytes within words used by said predetermined programmable machine.

A specific embodiment of the invention will now be described by way of example only.

The following two assembly code store instructions
movl $0xaabbccdd,[0]
movl $0x1223344,[2]
will have the following effect in a little-endian architecture:

| 1st Store | | 2nd Store | |
|---|---|---|---|
|  | 23 |  | 23 |
|  | ... |  | ... |
|  | 6 |  | 6 |
|  | 5 | 11 | 5 |
|  | 4 | 22 | 4 |
| aa | 3 | 33 | 3 |
| bb | 2 | 44 | 2 |
| cc | 1 | cc | 1 |
| dd | 0 | dd | 0 |

The first store instruction stores the least significant byte (dd) of the first 4-byte word (aabbccdd)at address '0', the second least significant byte at address '1', ect. The second address store instruction stores the least significant byte (44) of the second 4-byte word (11223344) at address'2', the second least significant byte at address '3', ect. Thus,the effect of storing the second 4-byte word is to overwrite the prior contents of address '2' and '3', and the two most significant bytes of the first 4-byte word 'aa' and 'bb' are lost.

If the same two store instructions are used in a big-endian architecture, the most significant byte (aa) of the first 4-byte word will be stored at address '0', the next most significant byte (bb) '1', etc. The second store instruction will overwrite the prior contents of address '2' and '3', as before, and the two least significant bytes of the first 4-byte word 'dd' and 'cc' will be lost. Thus, when a big-endian architecture is used, the contents of an addressed memory resulting from assembly code store instruction will differ from the contents of an equivalent memory when a little-endian architecture is used.

The invention allows both big-endian and little-endian words to be stored in such a way that any giving store instruction will result in the same bytes being stored in both architectures, although the order of the bytes is reversed. This is achieved by transforming memory access addresses such that the pattern of bytes stored in a memory addressed by for example a big-endian processor is a mirror image of the pattern which would have resulted if the memory had been addressed without transformation by a little-endian processor.

In the case of the assembly code store instructions given above, in order to accommodate a big-endian architecture, the two 4-byte words are stored in accordance with the present invention at the uppermost available addresses as shown below:

| 1st Store | | 2nd Store | |
|---|---|---|---|
| dd | 23 | Dd | 23 |
| cc | 22 | Cc | 22 |
| bb | 21 | 44 | 21 |
| aa | 20 | 33 | 20 |
|  | 19 | 22 | 19 |
|  | 18 | 11 | 18 |
|  | ... |  | ... |
|  | 0 |  | 0 |

To preserve information in the memory, the second of the two stores places the second 4-byte word at a lower address than the first 4-byte word, thus overwriting the same 2-byte word (0xaabb) of information as in the little-endian architecture. The effect in terms of the bytes stored in the memory of the assembly code instructions in the little-endian architecture is thus duplicated in the big-endian architecture, although the order of the bytes is reversed.

The above exemplification of the system in accordance with the present invention in relation to an unaligned store instruction demonstrates the flexibility of the system. The system may also be used for aligned store instructions.

The address transformations used as described above to preserve information in the big-endian architecture are:

| access type | Adjustment |
|---|---|
| word (4-byte) | addr'=[20-addr] |
| word (2-byte) | addr'=[22-addr] |
| byte | addr'=[23-addr] |

This generalises to:

| access type | general adjustment | where |
|---|---|---|
| word (4-byte) | addr'=endianAdj_L-addr | EndianAdj_L=progSize-4 |
| word (2-byte) | addr'=endianAdj_W-addr | EndianAdj_W=progSize-2 |
| byte | addr'=endianAdj_B-addr | EndianAdj_B=progSize-1 |

Thus, using the generalisation shown in the above table, the following operations in a little-endian architecture:
movw $0xaabb,[1]
movl [1],%eax will have the same effect as the following operations in a big-endian architecture:
movw $0xaabb,[22-1]
movl [20-1],%eax The effect of the above commands is shown below:

| little-endian 3rd Store | | big-endian 3rd Store | |
|---|---|---|---|
|  | 23 | Dd | 23 |
|  | ... | Bb | 22 |
| 11 | 5 | Aa | 21 |
| 22 | 4 | 33 | 20 |
| 33 | 3 | 22 | 19 |
| aa | 2 | 11 | 18 |
| bb | 1 |  | ... |
| dd | 0 |  | 0 |

The invention introduces one extra arithmetic operation for every load/store instruction. However, many instructions which access memory use address expressions which contain constant offsets such as:
addl %edx,0x8(ebp,eax,4)

which represents the effective address:
ebp+eax*4+8.

This expression, after memory access transformation in accordance with the invention has been applied, becomes:
endianAdj_L−(ebp+eax*4+8).

Folding the constants of the expression can be used to give: (endianAdj_L−8)−(ebp+eax*4).

Thus, folding allows those terms which may be calculated at translation time to separated from those terms which are held in registers and are unknown at translation time. Since the term 'endianAdj_L' is known at translation time its effect is calculated before run time, and the memory access transformation will not cause a loss of performance at run time. Thus, in general the big-endian transformation of the invention incurs no extra overhead for the majority of memory accesses.

A subject machine program (or operating system) is treated as if it is loaded contiguously from address 0, while internally being stored as a mirror image, as shown below:

| Actual Memory Configuration (big-endian) | | Memory Configuration intended by the assembly code (little-endian) | |
|---|---|---|---|
| c7 | 23 | | 23 |
| 45 | 22 | | ... |
| f8 | 21 | 00 | 6 |
| 03 | 20 | 00 | 5 |
| 00 | 19 | 00 | 4 |
| 00 | 18 | 03 | 3 |
| 00 | 17 | f8 | 2 |
| ... | | 45 | 1 |
| | 0 | c7 | 0 |

If the assembly code specifies access to the 4-byte value 0x00000003 at memory location 3, using the same program size as the previous examples, this memory access becomes endianAdj_L−3=(progSize−4)−3=(24−4)−3=17, which is the address in the big-endian mirror image of the value required.

Whereas the above examples illustrate use of the invention in transforming code intended for a little-endian architecture so that it will run on a big-endian system, the invention could be used to transform big-endian code to run on a little-endian system. Indeed, the invention can be used to transform between any two endian systems which are byte reversals of one another.

The endian transformation method may be used as part of a complete emulation system.

The advantages joined by the "folding" operation described above are not limited to the particular transformation described. A similar operation may be performed in other compilation or translation processes using transformed address space references in the compiled or translated code to include the changed address in an output instruction to reduce overheads during execution of that output instruction.

I claim:

1. An endian transformation method that enables program code of a first endian format to run on hardware of a different second endian format, wherein the hardware includes at least a processor and a memory, the method comprising the computer-implemented steps of:

(a) in a translation phase:

allocating a memory address range in the memory of length A bytes comprising a plurality of words arranged in a first relative order with respect to a starting address S;

receiving a plurality of input code instructions having memory access addresses which address the memory address range according to the first endian format for ordering the significance of bytes within words, where each access address B is of a respective string length L;

transforming each of said memory access addresses into transformed address expressions according to the expression −A−B−L+S; and translating the plurality of input code instructions into output code instructions executable by the hardware of the different endian format, where said output code instructions include said transformed address expressions; and (b) in an execution phase:

executing said output code instructions on said hardware to fetch and store data in the memory in the allocated memory address range using the transformed address expressions, whereby the relative order of bytes within each word is reversed into the second endian format and the plurality of words are addressed in a second relative order with respect to the given starting address which is a reverse of the first relative order.

2. The method of claim 1, further comprising the steps of:

in the translation phase:

identifying one or more constant terms and one or more variable terms in the expression A−B−L+S; and providing partially resolved transformed address expressions in the translated output code instructions, where the partially resolved transformed address expressions include the one or more variable terms and group together the one or more constant terms in the expression A−B−L+S; and in the execution phase:

completing calculation of the expression A−B−L+S for each of the partially resolved transformed address expressions according to the one or more variable terms to provide fully resolved transformed memory access addresses; and in said executing step, executing said output code instructions on said hardware of the different endian format to fetch and store data in the memory using the fully resolved transformed memory access addresses.

3. The method of claim 1, wherein the program code is written for a big-endian architecture and the hardware has a little-endian architecture, or the program code is written for a little-endian architecture and the hardware has a big-endian architecture.

4. An emulation system arranged to execute program code of a first endian format on hardware of a different second endian format, the emulation system comprising:

a processor of the second endian format;

a memory coupled to the processor;

a translator arranged to allocate a memory address range in the memory of length A bytes comprising a plurality of words arranged in a first relative order with respect to a starting address S, receive a plurality of input code instructions having memory access addresses which address the memory address range according to the first endian format for ordering the significance of bytes within words, where each access address B is of string length L, transform each of said memory access addresses into transformed address expressions according to the equation A−B−L+S, and translate the plurality of input code instructions into output code instructions executable by the hardware of the different second endian format, where said output code instructions include said transformed address expressions; and wherein the processor is arranged to execute said output code instructions to fetch and store data in the memory in the memory address range using the transformed address expressions, whereby the relative order of bytes within each word is reversed into the second endian format and the plurality of words are addressed in a second relative order with respect to the given starting address which is a reverse of the first relative order.

5. The emulation system of claim 4, wherein:

the translator is arranged to identify one or more constant terms and one or more variable terms in the expression A−B−L+S and provide partially resolved transformed address expressions in the translated output code instructions, where the partially resolved transformed address expressions include the one or more variable terms and group together the one or more constant terms in the expression A−B−L+S; and the processor is arranged to execute said output code instructions including completing calculation of the expression A−B−L+S for each of the partially resolved transformed address expressions according to the one or more variable terms to provide fully resolved transformed memory access addresses and to fetch and store data in the memory using the fully resolved transformed memory access addresses.

6. The emulation system of claim 4, wherein the program code is written for a big-endian architecture and the hardware has a little-endian architecture, or the program code is written for a little-endian architecture and the hardware has a big-endian architecture.

* * * * *